United States Patent [19]

Toy

[11] Patent Number: 4,523,970
[45] Date of Patent: Jun. 18, 1985

[54] PROCESS FOR MANUFACTURING SEALANT COATED ARTICLES

[75] Inventor: Lester T. Toy, Fremont, Calif.

[73] Assignee: Raychem Corporation, Menlo Park, Calif.

[21] Appl. No.: 500,226

[22] Filed: Jun. 7, 1983

Related U.S. Application Data

[63] Continuation of Ser. No. 276,111, Jun. 22, 1981, abandoned.

[51] Int. Cl.³ .................... B29D 7/02; B29D 23/04
[52] U.S. Cl. .................... 156/244.11; 138/137; 138/141; 156/244.13; 156/244.17; 156/244.24
[58] Field of Search .................... 156/85, 86, 244.11, 156/244.13, 244.24; 138/98, 137, 140, 141, 178

[56] References Cited

U.S. PATENT DOCUMENTS

| 2,027,962 | 1/1936 | Currie . | |
|---|---|---|---|
| 3,086,242 | 4/1963 | Cook et al. . | |
| 3,243,211 | 3/1966 | Wetmore | 156/86 |
| 3,297,819 | 1/1967 | Wetmore . | |
| 3,382,121 | 5/1968 | Sherlock | 156/86 |
| 3,669,824 | 6/1972 | Hess | 156/244.13 |
| 3,957,382 | 5/1976 | Greuel et al. | 156/86 |
| 3,965,215 | 6/1976 | Lopez et al. | 260/889 |
| 4,207,364 | 6/1980 | Nyberg | 156/86 |
| 4,310,367 | 1/1982 | Berejka | 156/86 |
| 4,373,554 | 2/1983 | Cook | 138/137 |

Primary Examiner—Caleb Weston
Attorney, Agent, or Firm—Edith A. Rice; Herbert G. Burkard

[57] ABSTRACT

A process for manufacturing a sealant coated heat recoverable polymeric article is disclosed. The process includes the steps of extruding at least two different polymeric materials to form a unitary shaped article and thereafter exposing the shaped article to a source of ionizing radiation to thereby cross-link one of the polymeric materials and convert the other polymeric material into a tacky sealant. The article may be rendered dimensionally heat recoverable by either: (a) deforming the article into a different shape at a temperature below the crystalline melt temperature of the cross-linkable material and then exposing the deformed article to a source of ionizing radiation or alternatively, (b) subsequent to an irradiation step, heating the article to about the crystalline melt temperature of the cross-linked material, distorting the article, and then cooling the article while maintaining it in the distorted shape to a temperature below the crystalline melt temperature; thereby by either method rendering the cross-linked portion of the article recoverable toward its original shape upon subsequent heating.

20 Claims, 6 Drawing Figures

U.S. Patent    Jun. 18, 1985    4,523,970
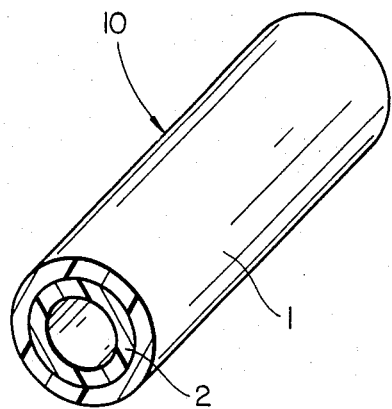
FIG_1
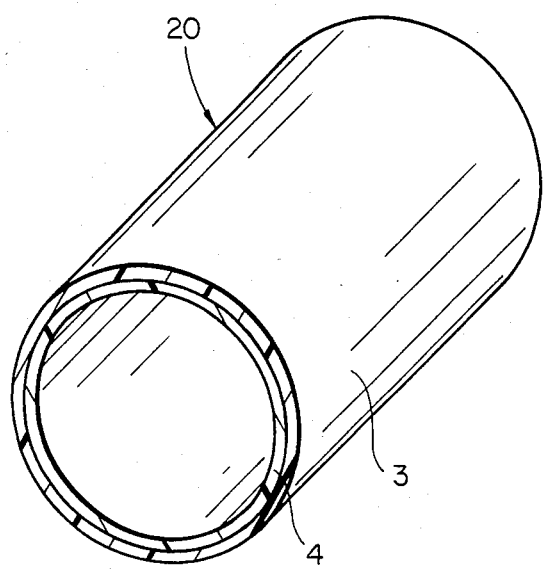
FIG_2
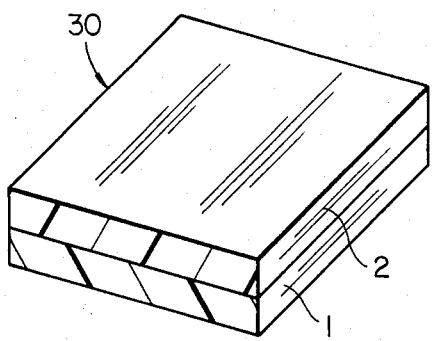
FIG_3
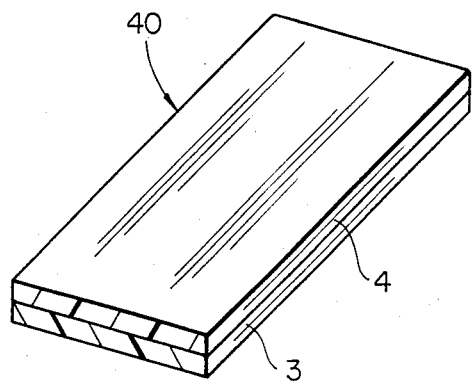
FIG_4
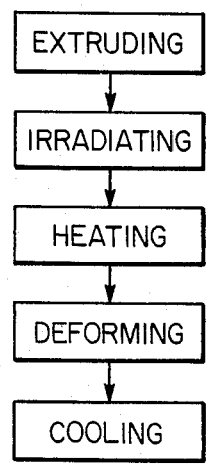
FIG_5
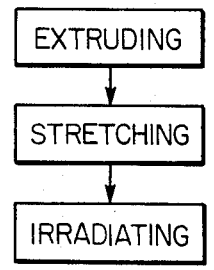
FIG_6

PROCESS FOR MANUFACTURING SEALANT COATED ARTICLES

This applicatin is a continuation of application Ser. No. 276,111, filed June 22, 1981, now abandoned.

BACKGROUND OF THE INVENTION

The present invention relates to a process for manufacturing sealant coated articles. More particularly, the present invention relates to a process for manufacturing a heat recoverable polymeric article, a portion of which article possesses sealant properties.

Heat shrinkable tubing with a sealant coating on its interior surface has been used for many years in a variety of commercial applications. For example, sealant lined heat shrinkable tubing is used to insulate and seal electrical connections and to environmentally protect welded joints in pipe lines. Such sealant lined heat recoverable tubings are described in Wetmore, U.S. Pat. No. 3,297,819, the disclosure of which is incorporated by reference herein. Similarly, sealant coated, longitudinally heat shrinkable tape has been applied to metallic pipes, pipe joints and the like to provide corrosion protection.

Because of their relatively low viscosities and generally high tack, conventional sealant compositions do not readily lend themselves to processing in thermoplastic extrusion equipment. Heretofore, the best known process for manufacturing lengths of internally sealant coated heat shrinkable tubing entailed a costly separate coating step, which frequently had to be manually carried out on a discrete piece basis. In this prior art process, flexible, heat shrinkable tubing such as that described in Currie, U.S. Pat. No. 2,027,962 and in Cook et al., U.S. Pat. No. 3,086,242 is internally coated with a sealant applied with a brush or swab. Prior to application, the sealant composition is typically thinned with a solvent or heated to render it more fluid.

In contrast to the difficult problems encountered when coating a sealant material on the interior surface of a tubular article, a sealant layer can be applied to one surface of a longitudinally heat recoverable backing tape with relative ease. However, such a heat shrinkable tape fabrication process is not particularly efficient as it requires at least two relatively slow speed steps, one to produce the backing, and another separate step carried out subsequent to cross-linking the backing, to apply the coating thereto, again by swabbing or brushing.

SUMMARY OF THE INVENTION

It is a principle object of this invention to provide novel and an efficient process for manufacturing a sealant coated, dimensionally heat recoverable article.

It is another object of the present invention to provide a unitary shaped article which is dimensionally heat recoverable and possesses a tacky, sealant material uniformly disposed along its extruded length.

It is a still further object of this invention to provide a melt processable polymeric composition which when subjected to ionizing radiation is readily converted into an effective tacky sealant composition.

The present invention overcomes many of the disadvantages associated with sealant coated, dimensionally heat recoverable articles and the processes for their manufacture as known in the prior art. It does so by providing a novel process for manufacturing such articles which includes the steps of extruding a first radiation cross-linkable polymer composition and also extruding (preferably substantially simultaneously) a second radiation convertible polymer composition to afford a unitary shaped article having a first configuration in which the article possesses portions formed respectively of the first and second compositions; and then exposing the shaped article to a source of ionizing radiation to initiate the formation of cross-linking chemical bonds between adjacent polymer chains in the first composition, and to induce chemical change in the second compositon, thereby transforming said second composition from a melt (e.g. extrusion) processable composition to a tacky, sealant composition having reduced melt strength so as to be generally unsuitable for extrusion. The article in said first configuration may be rendered dimensionally heat recoverable by the step of distorting it at a temperature below the crystalline melt temperature of the cross-linkable composition into a second configuratin either prior to the step of exposing the article to a source of ionizing radiation or alternatively, subsequent to the irradiation step, by the steps of heating the article to about the crystalline melt temperature of the first composition; distorting the article into a stretched second configuration; and then cooling the article while maintaining it in the second configuration thereby providing an article recoverable to or towards its first configuration upon subsequent heating.

BRIEF DESCRIPTION OF THE DRAWINGS

The many objects and advantages of the present invention will become apparent to those skilled in the art when the following description of the best mode contemplated for practising the invention is read in conjunction with the accompanying drawing wherein like reference characters refer to the same or similar elements and in which:

FIG. 1 is a perspecitve view of an extruded tubular article formed from two concentrically disposed polymer compositions;

FIG. 2 is a perspective view of a sealant lined heat recoverable sleeve formed in accordance with the process of the invention;

FIG. 3 is a perspective view of an extruded sheet article formed from two layers of polymer compositions;

FIG. 4 is a perspective view of a sealant coated, longitudinally heat shrinkable polymeric tape produced in accordance with the process of the invention;

FIG. 5 is a block flow diagram of a preferred sequence of process steps employed in the practice of the invention; and FIG. 6 is a block flow diagram of another preferred sequence of process steps employed in the practice of the invention.

DETAILED DESCRIPTION OF A PREFERRED EMBODIMENT

Referring now generally to the several figures, and specifically to FIG. 1, there is shown an extruded two layer tubular article 10. The outer layer 1 is formed from a radiation cross-linkable polymer composition. The inner layer 2 is formed from a radiation convertible polymer composition. Both polymer compositions are preferably easily processable in conventional thermoplastic extrusion equipment. It is to be understood that there are a variety of alternative manufacturing processes that can be employed to form the extruded tubular article 10. For example, the radiation convertible polymer composition used to form the inner layer 2 can be extruded as a tube and wound onto a take up reel. Subsequently, the radiation cross-linkable polymer composition used to form the outer layer 1 can be extruded over the inner layer 2 to form the tubular article 10. Alternatively, if two extruders are available, the extrusion of each of the two polymer compositions can be performed "in line" thereby eliminating the need to handle the tubing twice. Typically, in such a process the radiation convertible polymer composition would be extruded into a tube, run through a water bath, dried, and fed into the back of a second extruder which would apply the outer layer of the radiation cross-linkable polymer composition. Another, and preferable manufacturing process for fabricating the tubular article 10 employs a pair of extruders which simultaneously feed the two polymer compositions into a co-extrusion head where in the two polymer compositions meet and form the dual layer tubular article 10 substantially simultaneously. Co-extrusion is the preferred fabrication technique for tubular article 10 because it makes it easier to control such product perameters as for example, wall thickness and concentricity.

The possibilities for manufacturing process variations in the extruding step can be seen by reference to FIG. 3 wherein a two layered laminated sheet article 30 is shown with the first radiation cross-linkable polymer composition forming an outer layer 1 and the second radiation convertible polymer composition forming an inner layer 2. For example, either polymer composition could be extruded in a first pass and the other composition laminated to the first sheet in a subsequent extrusion pass. Alternatively, the sheet article 30 can be formed in a single pass using in line extrusion techniques. Another process variation entails separately extruding layers of each composition and laminating them together in a separate bonding operation. Preferably, a substantially simultaneous co-extrusion process is used to form the laminated sheet article 30. Because of the multiplicity of extrusion process variations that can be used to form shaped articles, as used herein the process step called "extruding" is intended to include multiple pass extrusions, in line extrusions, subsequent laminations of previously extruded components, and simultaneous extrusions made with co-extrusion tooling.

Two principle process variations are available to impart the property of heat recoverability to those portions of a shaped article formed from the first, i.e. radiation cross-linkable, polymer composition. These process variations are shown diagrammatically in FIGS. 5 and 6. In general, although not invariably, higher recovery ratios can be obtained by using the process shown in FIG. 5. This process is described in greater detail in the Cook et al. U.S. Patent referenced above.

For selected applications, modest expansion and associated recovery are frequently adequate. For example, in the manufacture and use of sealant coated heat recoverable tape used to protectively wrap metallic pipelines, a longitudinal expansion and associated recovery of 10 to 20% is sufficient. The process shown diagrammatically in FIG. 6 allows sealant coated heat shrinkable tape to be manufactured at a lower cost than heretofore thought possible. The preferred manufacturing process employing the present invention involves the co-extrusion of the first and second polymer compositions to form the laminated sheet article 30 shown in FIG. 3. The sheet 30 passes over a chilled calendar roll (not shown) which is typically part of a three roll stack of the type well known to those skilled in the art of polymer sheet extrusion. The sheet 30 is subsequently passed through a set of calendar rolls (also not shown) which are rotating at differnt surface velocities to impart the desired amount of longitudinal stretch (typically 10 to 20%) to the sheet. Before the sheet is wound on to a take up reel, the edges are trimmed to produce a tape of uniform width. At this point, the sheet is very easy to handle because the layer formed from the second radiation convertible polymer composition does not exhibit significant tack, self adhesion or oher properties which would make handling awkward. Manufacture of the heat shrinkable, sealant coated tape 40 is completed by exposing the sheet to a source of ionizing radiation to thereby cross-link the first polymer composition and form cross-linked outer layer 3 shown in FIG. 4 and simultaneously convert the second polymer composition into a tacky sealant composition shown as sealant layer 4 in FIG. 4.

The preferred source of ionizing radiation is high energy electrons such as those produced by an electron beam generator. However, it is to be understood that other sources of ionizing radiation can also be suitably employed. A sheet of release paper (not shown) can suitably be disposed between adjacent layers of the sealant coated tape as it leaves the electron beam and is wound onto a take-up reel to facilitate subsequent handling of the product.

As has been heretofore indicated, the present invention entails the discovery of a novel and superior process for the fabrication of heat recoverable sealant coated articles. In addition, my invention entails the discovery that certain materials when subjected to irradiation at a dose level of from about 2 to about 50 megarads, preferably 5 to 20 megarads, are transformed from extrusion processible thermoplastics into tacky sealants.

As used herein the term "sealant" connotes an adhesive material which is used for filling voids and interstices to provide a seal against moisture, dust, solvents and/or other fluids. Sealant compositions are viscid, water resistant macromolecular compositions resembling Newtonian fluids in exhibiting both viscous and elastic response to stress. They usually, although not invariably, exhibit (in the sense of ASTM 1146) second order cohesive blocking (and preferably second order adhesive blocking to substrates such as metals as well) at a temperature between room temperature and the crystalline melt or glass transition temperature or range of the sealant composition. They will preferably have a cohesive strength generally of the same order as their adhesive strength. Conventional sealant compositions usually comprise mixtures of elastomers, or mixtures of thermoplastic polymers, or both, and include both mastics and hot melt sealants as described in Bullman, Adhesives Age, November 1976, pages 25-28. Mastics generally consist of mixtures of substantially non-crystalline materials, for example, bituminous materials, elastomers, or thermoplastic polymers. Sealants, including those prepared according to the instant invention, frequently contain inert fibrous or powdered fillers tackifiers, stabilizers and/or antirads.

A generally suitable method for determining the viscosity of sealant materials is set forth in ASTM D-3570 (Procedure A or B).

Conventional sealants, as previously indicated, are generally not suitable for extrusion processing because of their high degree of tackiness and low melt strength. My invention overcomes this problem and permits rapid and facile extrusion in that a thermoplastic organic polymeric material (the sealant precursor) is available in the form of relatively free flowing pellets which do not adhere to each other and which do not slump or otherwise loose their pellet configuration prior to entrance into the extruder barrel. As previously indicated, a particularly advantageous process of the instant invention for fabricating the sealant coated, heat recoverable articles involves coextrusion of the polymer which is to be rendered heat recoverable and the polymer which is convertible into a sealant. To be suitable for coextrusion with a thermoplastic of the type suitable for radiation cross-linking (to enable the thermoplastic to be made heat recoverable), the co-extrudate (i.e. the precursor polymer which is radiation convertible to a sealant) should have a viscosity ranging from about 0.1 to about $10^6$ poise, preferably $10^2$ to $10^4$ poise, at its extrusion temperature. The extrusion temperature of the co-extrudate will conventionally be approximately equal to the melting point of the thermoplastic.

Conventional sealants are tacky, exhibit severe slump and generally have unsuitable viscosities for extrusion, much less coextrusion with thermoplastics. It is for this reason that as heretofore indicated, conventional sealants ordinarily require separate, relatively expensive procedures to apply them as a coating (frequently solvent diluted) onto thermoplastic articles.

I have discovered certain polymeric compositions (i.e. sealant precursors), which prior to irradiation have low tackiness, exhibit little slump and have viscosities which permit facile extrusion or coextrusion. The sealant precursor compositions useful in the practice of the instant invention can be processed on high speed compounding equipment for thermoplastics to produce free flowing pellets. These pellets can be extruded or, alternatively, coextruded with another polymeric material (i.e. a radiation cross-linkable thermoplastic) to form a unitary article which is heat recoverable. Exposing the formed article to irradiation crosslinks the thermoplastic and transforms the sealant precursor into a tacky sealant material with high flow. The viscosity of the sealant precursor will suitably be greater before irradiation than after. This is desirable since a relatively high viscosity for the sealant precursor simplifies coextrusion, and low viscosity after irradiation improves the wettability of the sealant.

Another advantageous property of the compositions of the instant invention is that by adjusting their composition I can ensure that they exhibit cohesive and adhesive blocking of either the first or the second degree after irradiation. Second degree blocking connotes that if opposing surfaces are pressed together and then separated there will be a transfer of sealant material. First degree blocking connotes the situation where no transfer of material occurs. Blocking is defined in greater detail in ASTM Method D-1146. First degree adhesive blocking is advantageous in that it allows tubular articles with an interior sealant coating to slide freely along a pipe or cable, and tape articles to be applied as a pressure sensitive tape. Unwinding of the sealant coated tape to adjust position is also possible prior to heat recovery. Second degree adhesive blocking is characteristic of mastic type materials which manifest self sealing and reduced craft sensitivity. Another benefit of my sealants is that they have good load bearing characteristics and not creep at high ambient temperatures.

The sealant precursors of the instant invention contain as essential components a thermoplastic (Component A) and a rubber (Component B). Other conventional constituents of sealants such as stabilizers, antirads, inorganic and/or organic fillers and tackifiers may also be present if desired.

Based on the combination of Components A and B only, Component A will comprise 30 to 95% of the combination (preferably 50 to 90%) and Component B correspondingly 5 to 70% (preferably 10 to 50%).

As heretofore indicated, the sealants of the instant invention can be "tailored" so as to manifest, after irradiation, either first or second order blocking depending upon the requirements of the application. Although the precise ratio of Component A/Component B required to afford a sealant manifesting first order blocking will vary depending upon the chemical nature and molecular weight of Components A and B, I have found that if the ratio of A:B is $\geq 2.5:1$ the sealant will ordinarily manifest first order blocking. If the ratio A:B is $<2.5:1$ the sealant will obviously manifest second order blocking.

Chemically Component A may be defined as a thermoplastic polymer. Thermoplastics are materials which differ from thermosets or elastomers in that when subjected to heat they do not cure or set but rather soften to a flowable state in which they can be forced from a heated cavity such as an extruder head. Suitable polymers include homopolymers of ethylene, propylene, vinyl chloride and vinylidene fluoride and copolymers thereof with each other and/or with one or more other copolymerizable olefinic co-monomers such as vinyl acetate, methyl and ethyl acrylate, halogenated ethylenes and halogenated propylenes; styrene-diene block copolymers, polyamides, and polyesters.

Component B of the sealant has been described as a "rubber". As used herein the term "rubber" is intended to encompass not merely natural and synthetic rubber but also those sythetic rubber like materials exhibiting elastomeric or rubber like properties. Suitable rubbers for Component B include polyisobutylene, butyl rubber, brominated or chlorinated butyl rubber and epichlorohydrin rubber. A critical requirement of Component B is that it undergo chain scission when subjected to irradiation since this chain scission is believed to be the mechanism whereby the melt processable sealant precursor is transformed into a tacky sealant. Radiation generally has the effect of causing cross-linking of rubbers so it is essential that the rubbers of the instant invention have a scission/cross-linking ratio at 20° C. of $\geq 4:1$.

The practice of the invention is illustrated by the following example in which all parts are by weight.

EXAMPLE I

The properties of an irradiated sealant prepared according to the teaching of the present invention (Formulation B) are compared to those of a typical conventional mastic type sealant (Formulation A) in Table 1. TMA flow temperature and T-peel data show the superior load bearing capability of Composition B. Finally, blocking and tack data of Composition B show first degree blocking with the sealant manifesting good tack. Irradiation was at a dose level of 8 and 16 megrads. Irradiation at 8 megrads of Formulation A results in a fall off in T-peel values.

TABLE I

| Composition | Weight % | |
|---|---|---|
| | A | B |
| Butyl Rubber | 50.0 | — |
| Atactic Polypropylene | 50.0 | — |
| Butyl Rubber | — | 15.0 |
| Ethylene/Vinylacetate Thermoplastic | — | 18.5 |
| Ethylene/Vinylacetate/ Methacrylic Acid Thermoplastic Terpolymer | | 50.0 |
| Tackifier (Hydrogenated hydrocarbon) | | 15.0 |
| Antirad | | 1.0 |
| Antioxidant | | 0.5 |

PROPERTIES

| Composition | A | B | B | B |
|---|---|---|---|---|
| Radiation Dose (Mrads) | 0 | 0 | 8 | 16 |
| TMA 50% Flow Temperature (°C.) | 23 | >60 | >60 | 65 |
| T-Peel (PLI) Polyethylene to Polyethylene | 1 | 10 | 10 | 10 |
| Polyethylene/Ethylene vinyl acetate to Polyethylene/Ethylene vinyl acetate | 2 | >15 | >15 | >15 |
| Dynamic Viscosity at 90° C., 400 radian/sec. (10$^3$ poise) | 1.8 | 2.2 | 2.0 | 1.9 |
| Melt Flow at 150° C., 2160 gm (gm/10 min.)* | >200 | 54 | 67 | 82 |
| Falling Ball Tack (cm of roll) | 0 | 12 | 9 | 7 |

*Note that material having melt flow values in excess of 200 and high tack makes coextrusion inconvenient or impossible. However, within such outer limit the greater the melt flow the less the craft sensitivity.

EXAMPLE II

The properties of adhesive compositions with elastomer content varying from 10 to 25 wt.% are shown in Table 2. T-peel and melt flow data show the load bearing capabilities of these adhesives and the improvements in flow after irradiation.

EXAMPLE 2

| | Weight % | | | |
|---|---|---|---|---|
| | C | D | E | F |
| Composition | | | | |
| Butyl Rubber | 10 | 15 | 20 | 25 |
| Ethylene/Vinyl Acetate Thermoplastic Copolymer | 23 | 18 | 13 | 8 |
| Ethylene/Vinyl Acetate Methacrylic Acid Thermoplastic Terpolymer | 50 | 50 | 50 | 50 |
| Hydrogenated Hydrocarbon Tackifier | 15 | 15 | 15 | 15 |
| Antirad | 1 | 1 | 1 | 1 |
| Antioxidant | 0.5 | 0.5 | 0.5 | 0.5 |
| Properties | | | | |
| T-Peel (PLI) Polyethylene/Ethylene vinyl acetate to Polyethylene/Ethylene vinyl acetate, 10 Mrads | 13 | 14 | 9 | 7 |
| Melt Flow at 150° C., 2160 gm (gm/10 min.) | | | | |
| 0 Mrads | 59 | 49 | 49 | 32 |
| 10 Mrads | 59 | 64 | 62 | 63 |
| 20 Mrads | 48 | 58 | 67 | 83 |

I claim:

1. A process for manufacturing a sealant coated dimensionally heat-recoverable laminated sheet comprising the steps of:
   selecting a first polymer composition comprising a radiation cross-linkable polymer;
   forming a second polymer composition by admixing a thermoplastic component and a rubber component in proportions such that the composition comprises 30 to 95% of the thermoplastic component and 5 to 70% of the rubber component, said second composition being radiation convertible to a sealant composition;
   extruding said first and second polymer compositions to form a unitary laminated sheet possessing two layers formed respectively of said first and second polymer compositions and being in a first configuration;
   deforming said sheet at a temperature below the crystalline melt temperature of said first composition in to a second configuration; and
   exposing said sheet to a source of ionizing radiation to initiate the formation of chemical bonds between adjacent polymer chains in said first composition, and to induce chemical change in said second composition, thereby converting said second composition from a melt processable composition to a sealant composition and rendering said first composition recoverable towards said first configuration upon subsequent heating.

2. A process of claim 1 wherein said radiation convertible polymer composition from the group consisting of ethylene-vinyl acetate copolymer and ethylene-vinyl acetate-methacrylic acid terpolymer and a rubber component comprising butyl rubber.

3. The process of claim 1 wherein the laminated sheet is stretched along its longitudinal axis.

4. The process of claim 1 wherein the radiation cross-linkable polymer composition comprises a polymer selected from the group consisting of polyethylene, polyethylene vinyl acetate, polyethylene ethyl acrylate, polypropylene, polyamides and styrene-diene copolymers.

5. The process of claim 1 wherein the rubber component is selected from the group consisting of polyisobutylene, butyl rubber, brominated butyl rubber, chloronated butyl rubber, epichlorohydrin rubber and mixtures thereof.

6. A process for manufacturing a sealant coated, dimensionally heat-recoverable dual layer tubular article comprising the steps of:
   selecting a first polymer composition comprising a radiation cross-linkable polymer;
   forming a second polymer composition by admixing a thermoplastic component and a rubber component in proportions such that the composition comprises 30 to 95% of the thermoplastic component and 5 to 70% of the rubber component, said second composition being radiation convertible to a sealant composition;
   extruding said first and second polymer compositions to form a unitary dual layer tubular article possessing an outer tubular layer formed from said first radiation cross-linkable polymer composition disposed concentrically around an inner tubular layer formed from said second radiation convertible polymer composition and being in a first configuration;
   exposing said article to a source of ionizing radiation to initiate the formation of chemical bonds between adjacent polymer chains in said first composition, and to induce chemical change in said second composition, thereby converting said second composition from a melt processable composition to a sealant composition;

heating said article to about the crystalline melt temperature of said first composition;

deforming said article into a second configuration; and cooling said article while maintaining it in said second configuration thereby rendering it recoverable towards said first configuration upon subsequent heating.

7. A process of claim 6 wherein said radiation convertible polymer composition from the group consisting of ethylene-vinyl acetate copolymer and ethylene-vinyl acetate-methacrylic acid terpolymer and a rubber component comprising butyl rubber.

8. The process of claim 6 wherein the rubber component is selected from the group consisting of polyisobutylene, butyl rubber, brominated butyl rubber, chloronated butyl rubber, epichlorohydrin rubber and mixtures thereof.

9. The process of claim 6 wherein said dual layer tubular article is deformed by uniform radial expansion.

10. The process of claim 6 wherein said first radiation cross-linkable polymer composition comprises a polymer selected from the group consisting of polyethylene, polyethylene vinyl acetate, polyethylene ethyl acrylate, polypropylene, polyamides and styrene-diene copolymers.

11. A process for manufacturing a sealant coated dimensionally heat-recoverable dual layer tubular article comprising the steps of:

selecting a first polymer composition comprising a radiation cross-linkable polymer;

forming a second polymer composition by admixing a thermoplastic component and a rubber component in proportions such that the composition comprises 30 to 95% of the thermoplastic component and 5 to 70% of the rubber component, said second composition being radiation convertible to a sealant composition;

extruding said first and second polymer compositions to form a unitary dual layer tubular article possessing an outer tubular layer formed from said first radiation crosslinkable polymer composition disposed concentrically around an inner tubular layer formed from said second radiation convertible polymer composition and being in a first configuration;

deforming said article at a temperature below the crystalline melt temperature of said first composition into a second configuration; and exposing said article to a source of ionizing radiation to initiate the formation of chemical bonds between adjacent polymer chains in said first composition, and to induce chemical change in said second composition, thereby converting said second composition from a melt processable composition to a sealant composition and rendering said first composition recoverable towards said first configuration upon subsequent heating.

12. The process of claim 11 wherein the dual layer tubular article is deformed by uniform radial expansion.

13. The process of claim 11 wherein the radiation cross-linkable polymer composition comprises a polymer selected from the group consisting of polyethylene, polyethylene vinyl acetate, polyethylene ethyl acrylate, polypropylene, polyamides and styrene-diene copolymers.

14. The process of claim 11 wherein the rubber component is selected from the group consisting of polyisobutylene, butyl rubber, brominated butyl rubber, chloronated butyl rubber, epichlorohydrin rubber and mixtures thereof.

15. A process of claim 11 wherein said radiation convertible polymer composition from the group consisting of ethylene-vinyl acetate copolymer and ethylene-vinyl acetatemethacrylic acid terpolymer and a rubber component comprising butyl rubber.

16. A process for manufacturing a sealant coated, dimensionally heat-recoverable laminated sheet comprising the steps of:

selecting a first polymer composition comprising a radiation cross-linkable polymer;

forming a second polymer composition by admixing a thermoplastic component and a rubber component in proportions such that the composition comprises 30 to 95% of the thermoplastic component and 5 to 70% of the rubber component, said second composition being radiation convertible to a sealant composition;

extruding said first and second polymer compositions to form a unitary laminated sheet possessing two layers formed respectively of said first and second compositions and being in a first configuration;

exposing said sheet to a source of ionizing radiation to initiate the formation of chemical bonds between adjacent polymer chains in said first composition, and to induce chemical change in said second composition, thereby converting said second composition from a melt processable composition to a sealant composition;

heating said sheet to about the crystalline melt temperature of said first composition;

deforming said sheet into a second configuration; and cooling said sheet while maintaining it in said second configuration thereby rendering it recoverable towards said first configuration upon subsequent heating.

17. The process of claim 16 wherein said laminated sheet is stretched along its longitudinal axis.

18. The process of claim 16 wherein said first radiation cross-linkable polymer composition comprises a polymer selected from the group consisting of polyethylene, polyethylene vinyl acetate, polyethylene ethyl acrylate, polypropylene, polyamides and styrene-diene copolymers.

19. The process of claim 16 wherein the rubber component is selected from the group consisting of polyisobutylene, butyl rubber, brominated butyl rubber, chloronated butyl rubber, epichlorohydrin rubber and mixtures thereof.

20. A process of claim 16 wherein said radiation convertible polymer composition from the group consisting of ethylene-vinyl acetate copolymer and ethylene-vinyl acetatemethacrylic acid terpolymer and a rubber component comprising butyl rubber.

* * * * *